J. H. P. WALKER.
JIG FOR USE IN DRILLING AND BORING OPERATIONS.
APPLICATION FILED OCT. 30, 1918.
1,372,378.
Patented Mar. 22, 1921.
2 SHEETS—SHEET 1.
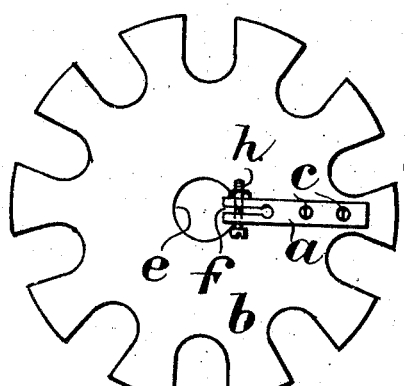
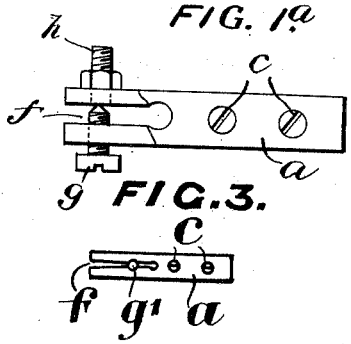
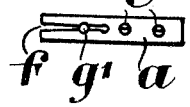
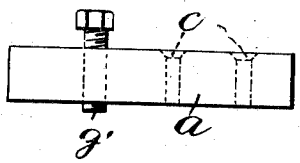
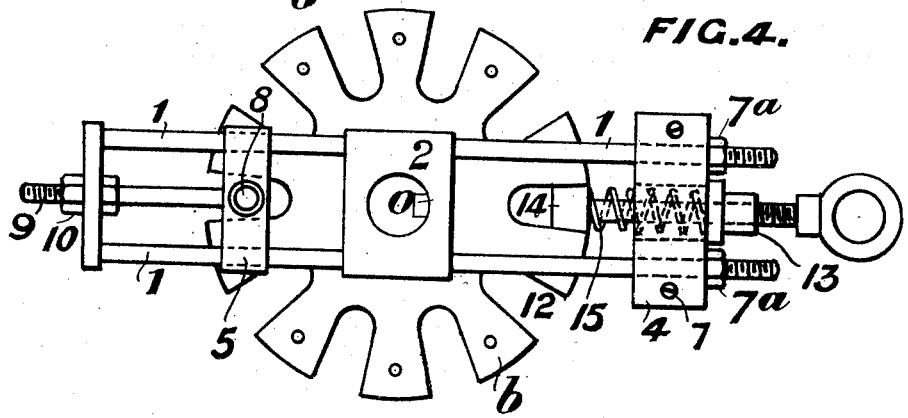
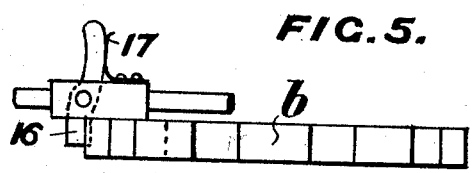
Inventor
James Hubert Phipps Walker.
By Henry Orth Jr
Atty.

J. H. P. WALKER.
JIG FOR USE IN DRILLING AND BORING OPERATIONS.
APPLICATION FILED OCT. 30, 1918.

1,372,378.

Patented Mar. 22, 1921.

UNITED STATES PATENT OFFICE.

JAMES HUBERT PHIPPS WALKER, OF TOTTENHAM COURT ROAD, ENGLAND.

JIG FOR USE IN DRILLING AND BORING OPERATIONS.

1,372,378.

Specification of Letters Patent.   Patented Mar. 22, 1921.

Application filed October 30, 1918.   Serial No. 260,297.

*To all whom it may concern:*

Be it known that I, JAMES HUBERT PHIPPS WALKER, a subject of the King of Great Britain, residing at 27 Francis street, Tottenham Court Road, in the county of Middlesex, England, have invented certain new and useful Improvements in and Relating to Jigs for Use in Drilling and Boring Operations, of which the following is a specification.

This invention comprises improvements in and relating to jigs for use in drilling and boring operations. Such jigs are employed when holes are to be drilled in predetermined positions, usually around a center, and are particularly useful when such holes cannot be drilled straight through from one side, but owing to the thickness or nature of the work, have to be drilled, first from one side and then from the other, any two alined and opposite drill holes meeting in, or about in, the middle of the work. For example, in the case of bolt holes in the bosses of aerial propellers, there is a tendency for the drill to wander from the true line, owing to the thickness of the boss and the nature or grain of the wood laminæ of which the boss is composed. In order that the orifices of these holes shall come fair with the holes in the engine plates which are bolted against respective faces of the boss, it is necessary to drill first from one side and then from the other as aforesaid, and it is of course essential that a hole drilled from one side should meet accurately the corresponding hole drilled from the opposite side.

The use of jig plates secured on respective faces of the boss and mounted on a spindle inserted through a central hole in the boss heretofore presented difficulties, owing to the inaccuracies which developed when attempting to secure true relative positioning of the jig plates by keying the said plates to the shaft.

One object of the present invention is to provide registering or keying devices to be used near the center and adapted for insuring the desired accuracy of the work. A further object is to economize material and to simplify and render more accurate, not only the positioning of the jig plates, but also of the drill guiding means when such is used in movable relation with the jig plates.

A further object is to provide registering and drill guide means on a support swiveling on the central shaft of the jig and coöperating with the jig plate, said registering means being arranged on a different radius from said drill guide means.

A further object is to provide a swiveling support in which the radii upon which the registering and drill guide means are respectively supported are angularly adjustable in relation to one another.

In order that the invention may be readily understood, reference is made to the accompanying drawings, in which:—

Figure 1 is a plan of a jig plate constructed and fitted in accordance with this invention.

Fig. 1ª is a plan partly in section, to a larger scale, of the key device seen in Fig. 1.

Fig. 2 is side elevation of Fig. 1.

Fig. 3 is a plan of a modified form of key.

Fig. 3ª is a side elevation, to a larger scale, of the key device shown in Fig. 3.

Fig. 4 is a plan of an adjustable swiveling arm or frame and a jig plate.

Fig. 5 is a side elevation of a jig plate and a portion of a modified construction of arm or frame and catch or key therefor.

Figure 6:
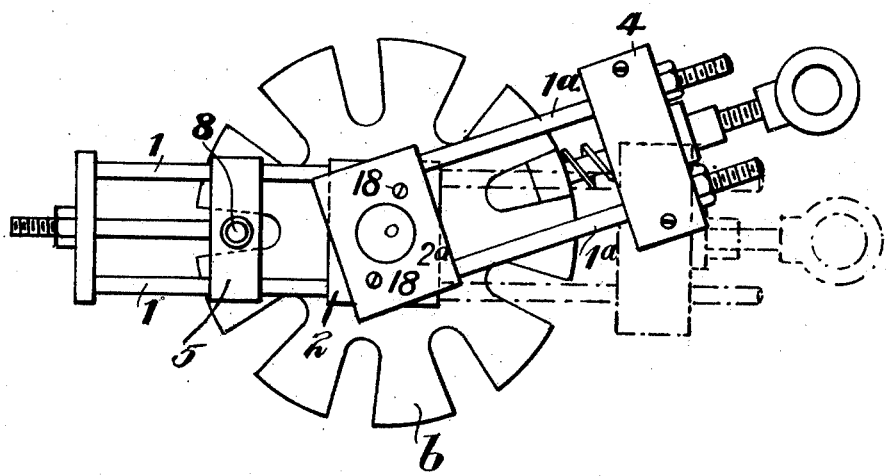
Figure 7:
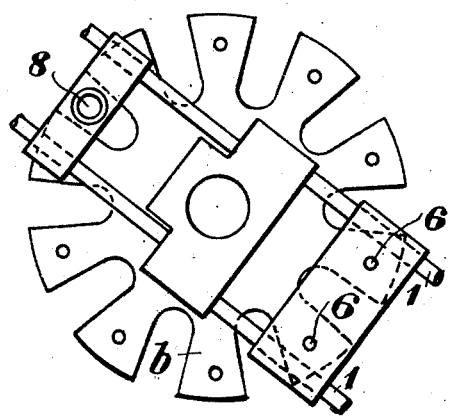

Fig. 6 is a plan of a modified construction of the arrangement seen in Fig. 4, and Fig. 7 is a plan of a further modification.

In one practical construction and as illustrated in Figs. 1 and 2, a strip of steel *a* is fastened radially on a jig plate *b* by screws *c*. The strip *a* may be fastened on one surface of the plate, or as shown in Fig. 2 in a suitable radial recess or groove *d* therein. The inner end of the strip projects into the central hole *e* for the spindle and is of such width as to enter the key-way in the spindle with a loose fit. The strip is split at *f* from the inner end for a suitable distance toward the outer end and a set screw *g* is screwed through one of the split parts, its point or end pressing against the other split part, or against a hardened plug or screw *h* fixed in the latter. When the jig plate is engaged with the spindle, therefore, the set screw *g* is screwed in so as to expand the split portion and in this manner the key is caused to engage very tightly with the walls of the key-way in the spindle. If desired the side walls of the key-way may be slightly inclined so that the key-way is slightly wider at the opening than at the bottom as will be readily understood. In the modified construction seen in Fig. 3 the split parts of the key at *f* are expanded by screwing down into the hole *g'* a tapered screw or stud. By means of the expansible locking means two jig plates similarly formed and fitted may be very accurately positioned in relation to one another in spite of the registering or keying devices being situated near to the center, as in the case when using a spindle of small diameter such as may be introduced into the bushing inserted into the central hole in a propeller. In spite of the smallness of the said diameter, the disks are accurately set on the spindle and this arrangement is very advantageous as compared with heavy jig devices which have to be applied to propeller bosses before the bushing is inserted.

As the bore of the bushings aforesaid is usually of one inch diameter, it follows that a single spindle of one inch diameter may be common to a set of jig plates suitable for use in connection with propeller bosses of different sizes and bores and having different numbers and dispositions of bolt holes. The improved jig devices are therefore not only accurate but also portable and interchangeable and involve in their construction less metal as compared with the known jig devices above referred to.

Fig. 4 illustrates an arm or frame, carrying drill guiding and registering means, the arm comprising parallel rods 1 mounted in a plate 2 which swivels about the central spindle *o*. The rods 1 are braced at their outer ends by a bracket 3 and a slider 5 is movable to desired positions along the rods in order to adjust the drill guiding bush 8 to the desired position, such adjustment being performed by the screw 9 and nut 10. Now in the construction seen in Fig. 4 the arm is extended beyond the spindle upon which it is revolubly mounted, the rods 1 passing through the plate 2 and extending diametrically across the jig plate as shown. This extended portion of the arm is fitted with means for engaging registering devices on the jig plate *b* on the opposite side of the spindle *o* to that on which the guide bush 8 is situated. For example, the extension of the arm may carry a second slide 4 which may be clamped in desired positions by screws 7 and nuts 7ª, and a plunger 13 having a head 14 for engaging peripheral slots or recesses 12 in the plate *b*, may be forced into engagement by a spring 15. In any construction, these registering devices are preferably situated at or near the periphery of the jig plate *b* in order to enable a high degree of accuracy to be obtained. The jig plate *b* may be formed with an even number of deep cogs or teeth which may be produced by a gear cutting machine, and, as shown in Fig. 5, the extended portion of the frame or arm may be fitted with a spring catch or key 16 for entering, and fitting accurately into, the space between any two teeth the catch 16 being released by pressure of the thumb against the action of the spring 17. Therefore, when the arm or frame is fixed in position by the engagement of the catch or key 14, Fig. 3, or 16, Fig. 4, in the space between two teeth, the bush or guide 8 will be situated over, or in radial alinement with, the diametrically opposite space between two teeth. The bush or guide 8 may be adjusted to any desired radial position and can approach the center as closely as the depth of the teeth will permit, and the registering device always acts at the maximum permissible distance from the center, thereby insuring a high degree of accuracy.

As seen in Fig. 4 the catch or key 14 may be given a slight taper and the spaces between the cogs or teeth may also be slightly tapered in order to render the engagement as accurate as possible. If the catch or key is carried on a pivotal lever or device as in Fig. 5, the pivot bearings may be adjustable to take up wear and preserve accuracy.

In another construction the extended portion of the arm or frame is angularly situated, or is adjustable circularly so that it can be fixed either in diametrical alinement with the arm or frame proper, or at an angle thereto.

This construction is advantageous, as it can be used for either an even number of bolt holes as in the case of the jig plate in Fig. 4 or for an uneven number of bolt holes as in the case of the jig plate in Fig. 6.

In Fig. 6, the rods 1 are fixed in a plate 2 and support the slide 5 and drill guide 8 as before, but the extension consists of a second plate 2ª swiveling on the same shaft *o*, as the plate 2 and carrying rods 1ª supporting the registering slide or fitting 4. The plate 2ª may be secured by means of screws 18, in either of two, or any one of several, positions, suitable holes being drilled in the plate 2 for the purpose. Thus the plate 2ª may be secured so that the rods 1, 1ª are in alinement as indicated in dotted lines, or so that they are at an angle to one another as shown in full lines. This construction is advantageous, as the extended portion can be engaged with registering devices not diametrically opposite the positions of the holes to be drilled as will be readily understood. If desired, the extended portion may be suitably widened as more or less diagrammatically shown in Fig. 7 and the slide 4 may be formed with several registering holes 6, or devices, any one of which may be used for engaging with devices on the jig plate *b* according to the number and disposition of the holes to be drilled. For example, one may be used for eight holes to be drilled around the circle and the other for ten holes around the circle.

In the example shown two holes 6 are formed in the slide and when the bush 8 is over one of the peripheral recesses between the teeth of the jig plate *b* these two holes 6 are over holes formed in two adjoining teeth about diametrically opposite the recess in question. As will be readily understood, other holes may be formed in the jig plate and in the slide 4 to suit other numbers and dispositions of holes to be drilled around a circle.

The invention is not limited to the precise details described and illustrated, as various modifications are possible without departing from the essential features hereinbefore described and particularly pointed out in the claims. In particular, the registering means for accurately positioning the swiveling means around the periphery of the jig plate are capable of taking various forms of construction for the purpose of obtaining the same effect as will be apparent to those versed in the art.

I claim:—

1. A jig for boring and drilling operation, comprising a jig plate formed with a central shaft aperture, an expansible key secured radially on one face of said plate so as to project into said aperture, and an adjustment upon said key for expanding it, substantially as and for the purpose set forth.

2. A jig for boring and drilling operations comprising a jig plate, a shaft formed with a keyway, a split key secured to said plate and adapted to enter said keyway, a set-screw screwing through one split portion of said key, and a hardened abutment plug screwed through the other split portion at a point opposite said set-screw substantially as set forth.

3. In a jig comprising a jig plate of circular contour, peripheral registering means on said plate, a swivel member circularly adjustable over said plate, drill guiding means movably mounted on said member at a distance from the swivel center, means operative to adjust said drill guiding means on said swivel member, and stop means for engaging said registering means on a different radius from that upon which the drill guiding means is situated, substantially as set forth.

4. In a jig, the combination with a central shaft, a jig plate of circular contour mounted on the shaft, of an arm mounted on the latter so as to be circularly adjustable over said plate, guide means for a drill carried by said arm, a similarly adjustable arm mounted on said shaft and fixed with respect to the first mentioned arm, and carrying means adapted to engage registering devices on said plate.

5. In a jig, the combination with a central shaft, a jig plate of circular contour mounted on the shaft, of an arm mounted on the latter so as to be circularly adjustable over said plate, drill guiding means carried by the arm, a second arm mounted on said shaft and similarly adjustable to and fixed with respect to the first mentioned arm, and registering means on the second arm for engaging peripheral registering means on the plate.

6. In a jig, the combination with a shaft, and jig plates of circular contour mounted on the shaft, of a support swiveled on the shaft, a radially adjustable drill guide on the support, a stop device on the latter, and means on said plates for registering with said stop.

7. The combination of a shaft having a keyway therein, a jig plate centrally mounted on the shaft, an expansible key fitted to said plate and engaging in the keyway, a screw for expanding the key, a support swiveled on the shaft, a stop device on the support, registering means on the plate adapted to engage the stop, a drill guide on the support, and a radial adjustment for said guide.

JAMES HUBERT PHIPPS WALKER.